US007089834B2

(12) United States Patent
Reynertson et al.

(10) Patent No.: US 7,089,834 B2
(45) Date of Patent: Aug. 15, 2006

(54) TORQUE WRENCH WITH TORQUE RANGE INDICATOR AND SYSTEM AND METHOD EMPLOYING THE SAME

(75) Inventors: John Reynertson, Geneva, IL (US); Jerome M. Gauthier, Roselle, IL (US)

(73) Assignee: Ryeson Corporation, Franklin Park, IL (US)

( * ) Notice: Subject to any disclaimer, the term of this patent is extended or adjusted under 35 U.S.C. 154(b) by 0 days.

(21) Appl. No.: 10/819,628

(22) Filed: Apr. 7, 2004

(65) Prior Publication Data

US 2005/0223857 A1 Oct. 13, 2005

(51) Int. Cl.
*B25B 23/144* (2006.01)
*B25B 23/159* (2006.01)
*G01D 1/14* (2006.01)
*G01L 5/24* (2006.01)

(52) U.S. Cl. ........................ 81/479; 81/483; 73/862.23

(58) Field of Classification Search .................. 81/479, 81/483; 73/847, 862.08, 862.21, 862.23, 73/862.26

See application file for complete search history.

(56) References Cited

U.S. PATENT DOCUMENTS

| | | | | |
|---|---|---|---|---|
| 4,558,601 | A * | 12/1985 | Stasiek et al. | 73/862.23 |
| 5,303,601 | A * | 4/1994 | Schonberger et al. | 73/862.23 |
| 5,911,801 | A | 6/1999 | Fravalo et al. | |
| 5,960,685 | A | 10/1999 | Shyong-Chuan et al. | |
| 5,979,273 | A | 11/1999 | Walton | |
| 6,076,439 | A | 6/2000 | Dzieman | |
| 6,155,147 | A | 12/2000 | Dzieman | |
| 6,167,788 | B1 | 1/2001 | Schonberger et al. | |
| 6,253,644 | B1 | 7/2001 | Duquette | |
| 6,314,846 | B1 | 11/2001 | Winick | |
| 6,405,598 | B1 * | 6/2002 | Bareggi | 73/761 |
| 6,463,811 | B1 | 10/2002 | Putney | |
| 6,463,834 | B1 | 10/2002 | Kemp et al. | |
| 2003/0094081 | A1 * | 5/2003 | Becker et al. | 81/479 |
| 2003/0105599 | A1 * | 6/2003 | Fisher et al. | 702/41 |
| 2004/0202001 | A1 * | 10/2004 | Roberts et al. | 362/494 |

FOREIGN PATENT DOCUMENTS

DE 19849293 A1 * 4/2000

* cited by examiner

*Primary Examiner*—David B. Thomas
(74) *Attorney, Agent, or Firm*—Marshall, Gerstein & Borun LLP

(57) ABSTRACT

A torque wrench is disclosed having torque range indicators. The torque wrench includes a handle, a torquing tool, a mounting bar and a programmable interface module. At least one torque sensor is communicatively coupled to the interface module. The interface module includes an input device able to receive at least one predetermined torque value, a torque value indicator, a torque range indicator, and a controller. The torque value indicator, the torque sensor, and the torque range indicator are communicatively coupled to the controller, and the controller is programmed to activate the torque range indicator based on a torque range calculated by comparing a torque value received from the torque sensor to the at least one predetermined torque value.

14 Claims, 8 Drawing Sheets

TORQUE WRENCH WITH TORQUE RANGE INDICATOR AND SYSTEM AND METHOD EMPLOYING THE SAME

FIELD OF THE DISCLOSURE

The disclosure generally relates to hand tools and, more particularly, relates to torque wrenches.

BACKGROUND OF THE DISCLOSURE

In many industrial applications, the tightening of threaded fasteners to a specific degree or torque is of extreme importance. For example, in the assembly of automobiles or aircraft, it is imperative that nuts, bolts, screws, lugs, and the like, are tightened to a pre-specified torque to ensure the resulting assembly functions properly not only at initial use, but over the long term. Moreover, it is not sufficient that the device simply be tightened as far as possible as this may result in stripping of the threads or vibrational problems in the resulting assembly.

Accordingly, it has long been known to use torque wrenches for tightening such devices. Such wrenches are not only able to rotate and tighten the device, but also provide the user with some sort of indication as to exact torque being applied. Such devices can be as straight forward as a bendable beam type wrench having a straight strain gauge thereon, whereby the user is provided with an indication as to the torque being applied by observing the degree of deflection of the bendable beam relative to the strain gauge. The strain gauge is provided with numbered graduations to provide the user with an accurate measurement.

In still further devices, it is known to provide the torque wrench in a ratchet type of assembly wherein each rotation or click of the ratchet represents a discrete level of torque being applied. However, such a device is normally not sufficiently accurate for the specifications being set forth by the automotive and aircraft industries which commonly employ such devices. More specifically, as each click represents only a discrete number of foot pounds, any movement between clicks will result in additional torque being applied, but not measured.

In still further torque wrench designs, known as shearing stress designs, sensors are mounted to a transducer of the wrench. The sensors measure the shearing stress being applied to the transducer as the wrench is rotated. A processor is provided on the wrench to then calculate the resulting torque based on the shearing stress being measured.

However, all currently known torque wrenches suffer from certain drawbacks resulting in less than optimal torque values and/or require an inordinate amount of time to use properly. For example, as the operator is rotating a fastener it becomes difficult for the operator to continue torquing the fastener while at the same time having to read the actual torque value on the torque value display. Similarly, the operator, in an attempt to reach the optimum torque value, may have to slowly proceed with small incremental increases in the applied torque until the optimal torque value is reached. It may take even a further amount of time if the operator is determined to achieve the exact prescribed torque value, even tough a variation of the prescribed or predetermined torque value is acceptable.

SUMMARY OF THE DISCLOSURE

In accordance with one aspect of the disclosure, a torque wrench is disclosed which may comprise a handle, a lever portion, a torquing tool, and a programmable interface module. The module includes an input able to receive at least one predetermined torque value, a torque range value indicator, and a controller. A torque sensor and the torque range value indicator are communicably coupled to the controller, and the controller is programmed to compare a torque value received from the torque sensor to the at least one predetermined torque value and activate a torque range indicator based on the comparison.

In accordance with another aspect of the disclosure, a method of indicating torque ranges is disclosed. The method may include providing a torque wrench having a programmable interface module and at least one torque sensor. The interface module includes a torque range value indicator and a controller. The method may further include measuring a torque value with the at least one torque sensor, comparing the measured torque value to a predetermined torque value, and then indicating, via the torque range indicator, a range related to the comparison of the measured torque value to the predetermined torque value.

Figure 1:
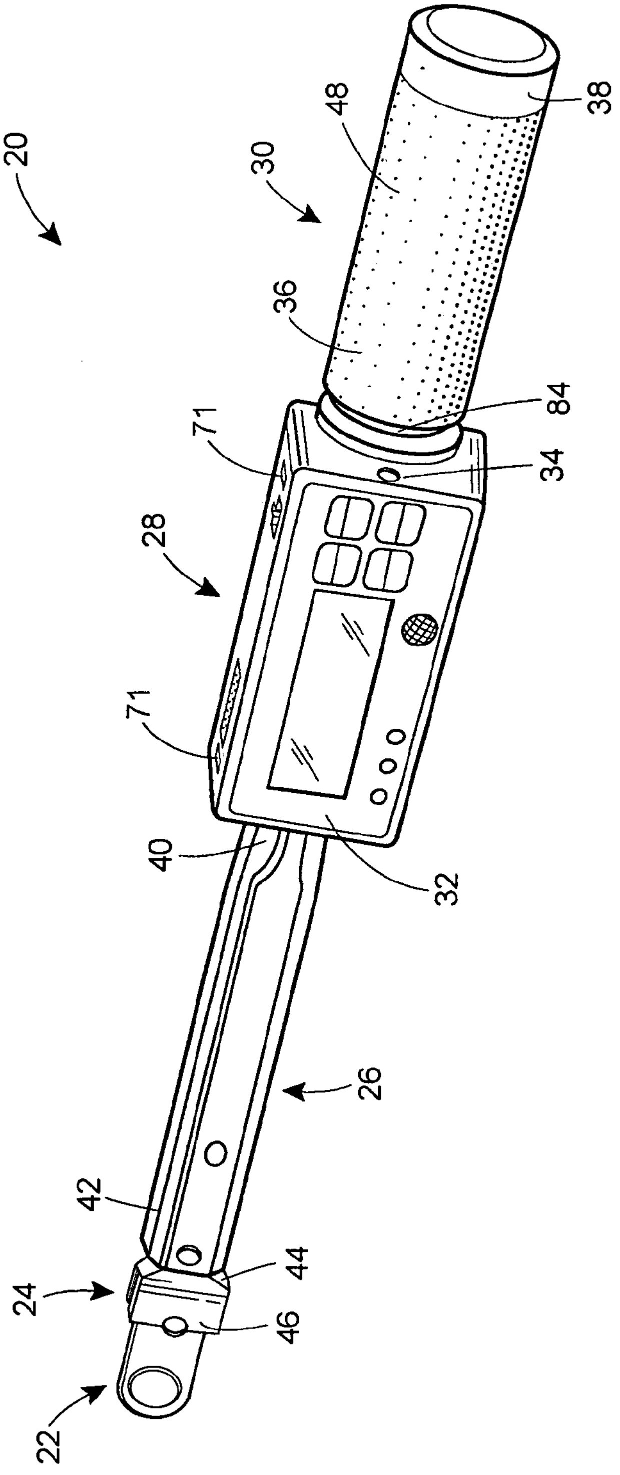
FIG. 1 is a perspective view of one exemplary embodiment of a torque wrench constructed in accordance with the teaching of the disclosure.

While the disclosure is susceptible to various modifications and alternative constructions, certain illustrative embodiments thereof have been shown in the drawings and will be described below in detail. It should be understood, however, that there is no intention to limit the disclosure to the specific forms disclosed, but on the contrary, the intention is to cover all modifications, alternative constructions, and equivalents falling within the spirit and scope of the invention as defined by the appended claims.

DETAILED DESCRIPTION

Turning now to the drawings, and with specific reference to FIG. 1, a torque wrench constructed in accordance with the teachings of the disclosure is generally referred to by reference numeral 20. As shown therein, the torque wrench 20 is of the type adapted to rotate a threaded fastener to a predetermined torque value. The torque wrench 20 may further be adapted to indicate an actual torque value, and may be adapted to indicate a torque range based on the actual torque value and the predetermined torque value.

Such high quality, accurate wrenches are particularly applicable for use in tightly toleranced assembly processes including those of the automotive and aircraft industries. Moreover, while the torque wrench 20 is described and depicted as being a digital torque wrench, it is to be understood that its teaching could be employed for creating an analog output as well.

Figure 2:
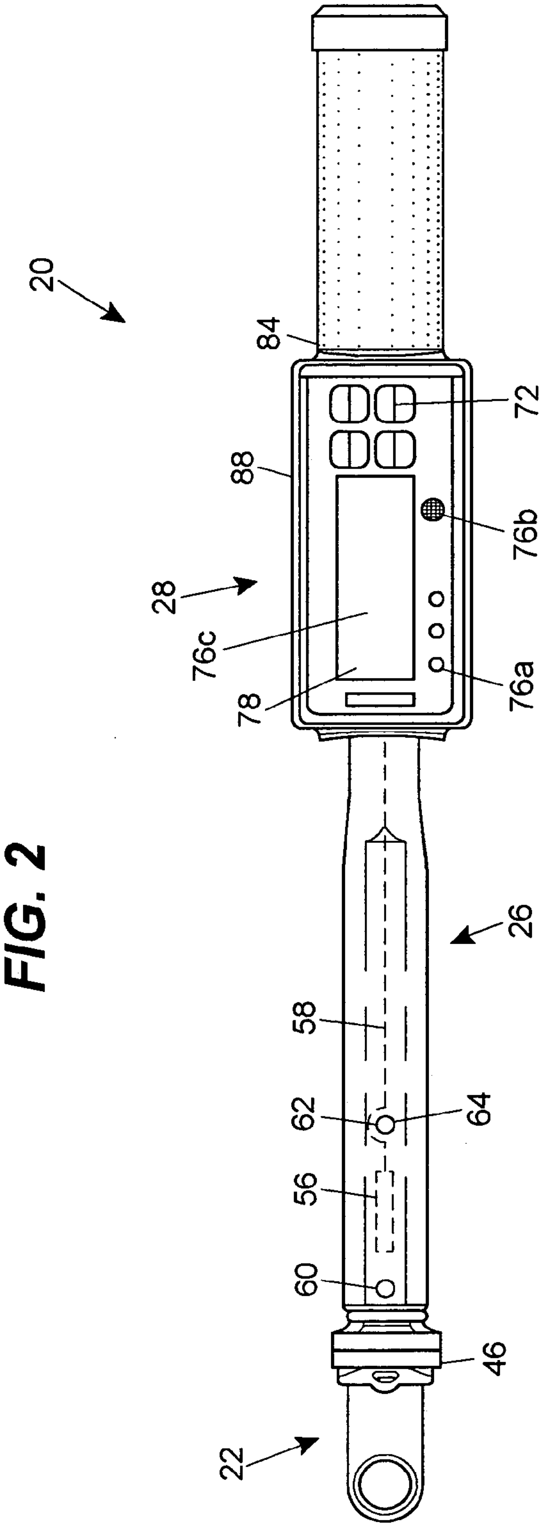
FIG. 2 is a front view of the torque wrench of FIG. 1.
Figure 3:
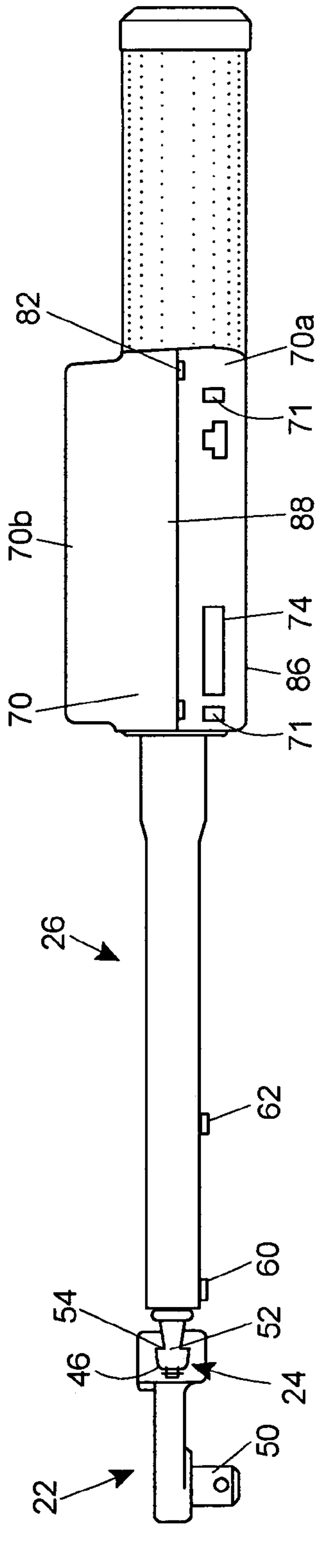
FIG. 3 is a top view of the torque wrench of FIG. 1.

Referring now to FIGS. 1–3, the torque wrench 20 is shown to include a torquing tool 22, a transducer beam 24, a mounting bar 26, an interface module 28, and a handle 30. The interface module 28 has a first end 32 and a second end 34, wherein the second end 34 connects to a first end 36 of the handle 30. A second end 38 of the handle 30 provides an area for grasping of the wrench 20 by the operator. A second end 40 of the mounting bar 26 connects to the first end 32 of the interface module 28, with a first end 42 having disposed there from a first end 44 of the transducer beam 24. The torquing tool 22 extends from a second end 46 of the transducer beam 24 and may be adapted to engage any type of threaded fastener. To facilitate gripping the second end 38 of the handle 30 may be etched or provided with an elastomeric or other tactile covering 48.

The torquing tool 22, as illustrated in FIG. 3, includes a head 50 adapted to interfit with a conventional socket, but it is to be understood that the torquing tool 22 could be provided in a variety of other configurations including open-ended wrenches, box-head wrenches, flare nuts, tubing and other hand tool wrenching configurations. A tool mounting head 52 is disposed at the second end 46 of the mounting bar 26. The mounting tool head 52 includes a dove tail design having first and second rearward shoulders 54 adapted to interfit with, and grip to, the torquing tool 22.

Figure 5:
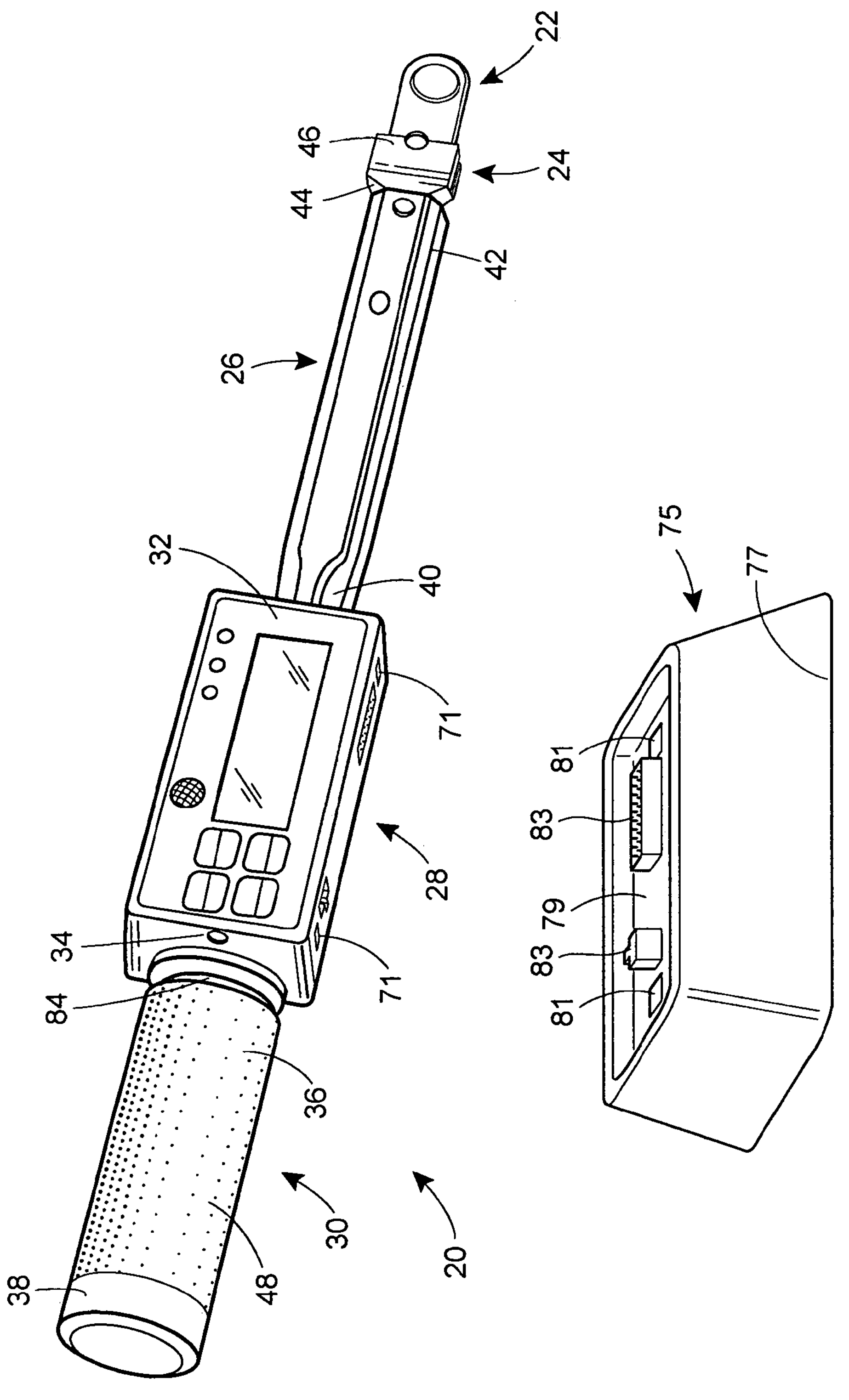
FIG. 5 is an isometric view of the torque wrench of FIG. 1 and a holder adapted to receive the torque wrench.

As will be described in further detail herein, the transducer beam 24 includes one or more sensors 56 (shown in phantom in FIG. 2 and shown schematically in FIG. 6) adapted to directly or indirectly measure a torque value on the fastener. The one or more sensors 56 may be arranged and mounted as described in U.S. patent application Ser. No. 10/427/821, filed on May 1, 2003, assigned to the present assignee and incorporated herein by reference. As far as the construction of the one or more sensors 56 is concerned, bonded foil strain gauges of the type adapted to measure shearing stress are preferable. In order to communicably couple the one or more sensors 56 to the interface module 28, conductors 58 are provided (FIGS. 2 and 5).

Referring now to FIGS. 2 and 3, the manner in which the transducer beam 24 is connected to the mounting bar 26 is shown in detail. More specifically, it will be noted that first and second mounting pins 60, 62 are swaged to, or otherwise frictionally interfit with, the mounting bar 26 and the transducer beam 24 for securement thereof. The pins 60, 62 extend not only through mounting holes (not shown) provided within the transducer beam 24, but correspondingly aligned apertures 64 provided within the mounting bar 26. The mounting bar 26 may be secured to the handle 30 through the interface module 28, and more specifically, may be fixedly secured thereto as by welding or the like.

Figure 4:
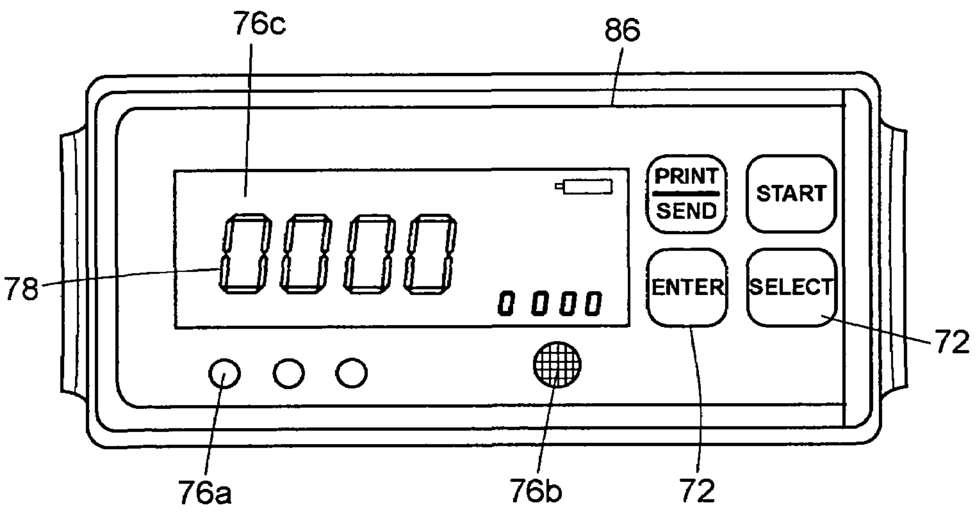
FIG. 4 is a detailed front view of an interface module of FIG. 1.
Figure 6:
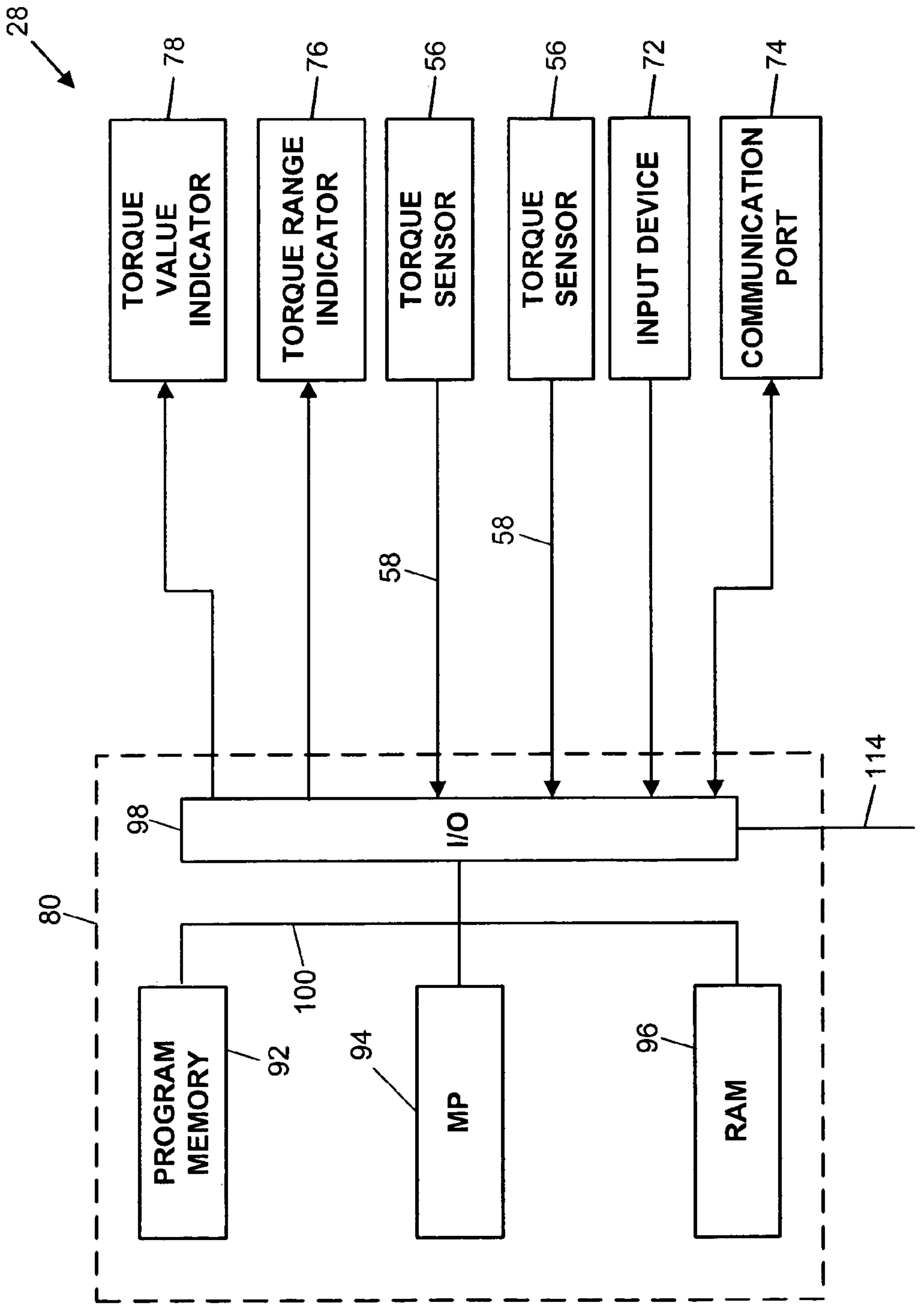
FIG. 6 is an exemplary schematic block diagram of electronic components in the interface module of FIG. 4.

The programmable interface module 28, as depicted in FIGS. 3–4 and as schematically shown in FIG. 6, may include a housing 70, one or more charge tabs 71, an input device 72, a communications port 74, torque range indicators 76*a*–*c*, a torque value indicator 78, and a controller 80. The housing 70, as seen in FIGS. 2-3, is provided in first and second substantially clam-shell type halves 70*a*, 70*b* which can be secured around the handle 30 using rivets or other fasteners 82. However, the clam shell halves 70*a*, 70*b* provide a mounting aperture 84 sufficiently larger than the handle 30 to allow for a relatively easy rotation of the interface module 28 about the handle 30. As the interface module 28 is hard wired to the one or more sensors 56 by conductors 58, the degree of rotation of the interface module 28 on the handle 30 is governed by the length of the wiring 58. Accordingly, pin and the slot arrangements (not shown) may be used to enable the interface module 28 to rotate, for example, thirty to sixty degrees, or whatever range of motion is afforded by the length of the wiring 58.

A top 88 of the housing 70, as seen in FIG. 3, may include one or more communications ports 74 adapted to communicatively couple the torque wrench 20 to an electronic device or network. The communications port 74 may be an RJ-45 jack, telephone port, a parallel port, a USB port, a serial port, or may be a wireless communications port, such that the communication port 74 may not be visually apparent, but is located inside the interface module 28. As such, the input device 72 may be communicably coupled to the torque wrench 20 via the communications port 74.

The one or more charge tabs 71 may be disposed anywhere on the torque wrench 20 and may, as in this exemplary embodiment, be disposed near the communications port 74. The charge tabs 71 may be constructed from a metal material, and may be electrically connected to a rechargeable battery of the torque wrench 20. As such, the battery of the torque wrench 20 may be recharged by electrically connecting the battery to the charge tabs 71. Alternatively, the charge tabs 71 may be one or more outlets adapted to receive a plug from a charging device (not shown).

A front 86 of the housing 70 may include the input device 72, one or more of the torque range indicators 76*a*–*c*, and the torque value indicator 78. The input device 72, as seen in FIG. 4, may be one or more buttons 72 adapted to receive input information from the user, or may be any other device adapted to receive input from a user, including but not limited to, a touch screen, microphone, switch, or the like. The input device 72 may be configured to program the interface module 28, but may also be configured to activate/deactivate the interface module 28, change settings, enter values, print information, etc.

The torque range indicator 76 and the torque value indicator 78, as seen in FIGS. 2 and 4, may be any type of indicator able to convey a torque range/value to the user, including any type of audio, visual and/or tactile indicator. For example, the torque range indicator 76 may be a light or bulb 76*a* that changes color as the torque ranges change, or may be a plurality of lights or bulbs 76*a*, wherein different lights are lit depending on the torque range. Similarly, the torque range indicator 76 may be a speaker 76*b* that provides a different sound depending on the torque range. The torque range indicator 76 may also be a backlit LCD screen 76*c*, wherein the backlighting changes color depending on the torque range. For example, the backlight of the LCD screen 76*c*, may change from a yellow color indicating an unacceptably low torque range, to a green color indicating an acceptable torque range, to a red color, indicating an unacceptably high torque range. The torque value indicator 78 may similarly vary, but in this exemplary embodiment, as seen in FIG. 4, is digital numerical indicator 78.

The torque wrench 20 may be coupled via the communications port 74 or be charged via the charge tabs 71, while being disposed in a holder 75, as seen in FIG. 5, such as a docking station or cradle. The holder 75 may include a base 77, a receiving portion 79, charge pins 81, and port adaptors 83. The base 77 may include a mechanism, aperture, or attachment (not shown) for attaching the holder 75 to a wall or other object, or may be substantially flat for placement of the holder on a generally flat surface, such as a table, tool box, etc. The receiving portion 79 may be a recess or cavity as shown in FIG. 5, adapted to receive at least some portion of the torque wrench 20, but may be any type of receiving portion 79 adaptable to receive the torque wrench 20. The charge pins 81 and port adaptors 83 may be disposed anywhere on the holder 79 engageable with the charge tabs 71 and the communications port 74, respectively, and may, as in this example, be disposed within the receiving portion 79. As such, when the torque wrench 20 is disposed in the receiving portion 79, the charge pins 81 and port adaptors 83 may be aligned with the charge tabs 71 and the communications part 74, thereby enabling the torque wrench 20 to be charged and/or communicably coupled by placement of the torque wrench 20 in the holder 75.

In schematic form, as shown in the block diagram of FIG. 6, a number of components may be incorporated into the interface module 28. Referring to FIG. 6, the interface module may include a controller 80 that may comprise a program memory 92, a microcontroller or microprocessor (MP) 94, a random-access memory (RAM) 96, and an input/output (I/O) circuit 98, all of which may be interconnected via an address/data bus 100. It should be appreciated that although only one microprocessor 94 is shown, the controller 80 may include additional microprocessors. Similarly, the memory of the controller 80 may include multiple RAMs 96 and multiple program memories 92. Although the I/O circuit 98 is shown as a single block, it should be appreciated that the I/O circuit 98 may include a number of different types of I/O circuits.

FIG. 5 also illustrates that the one or more torque sensors 56, the torque value indicator 78, the torque range indicators 76*a–c*, the communications port 74, and an input device 72 may be operatively coupled to the I/O circuit 98, each of those components being so coupled by either a unidirectional or bidirectional, single-line or multiple-line data link, which may depend on the design of the component that is used.

The components 56, 72, 74, 76, and 78 may be connected to the I/O circuit 98 via a respective direct line or conductor. Different connection schemes could be used. For example, one or more of the components shown in FIG. 6 may be connected to the I/O circuit 98 via a common bus or other data link that is shared by a number of components. Furthermore, some of the components may be directly connected to the microprocessor 94 without passing through the I/O circuit 98.

Figure 7:
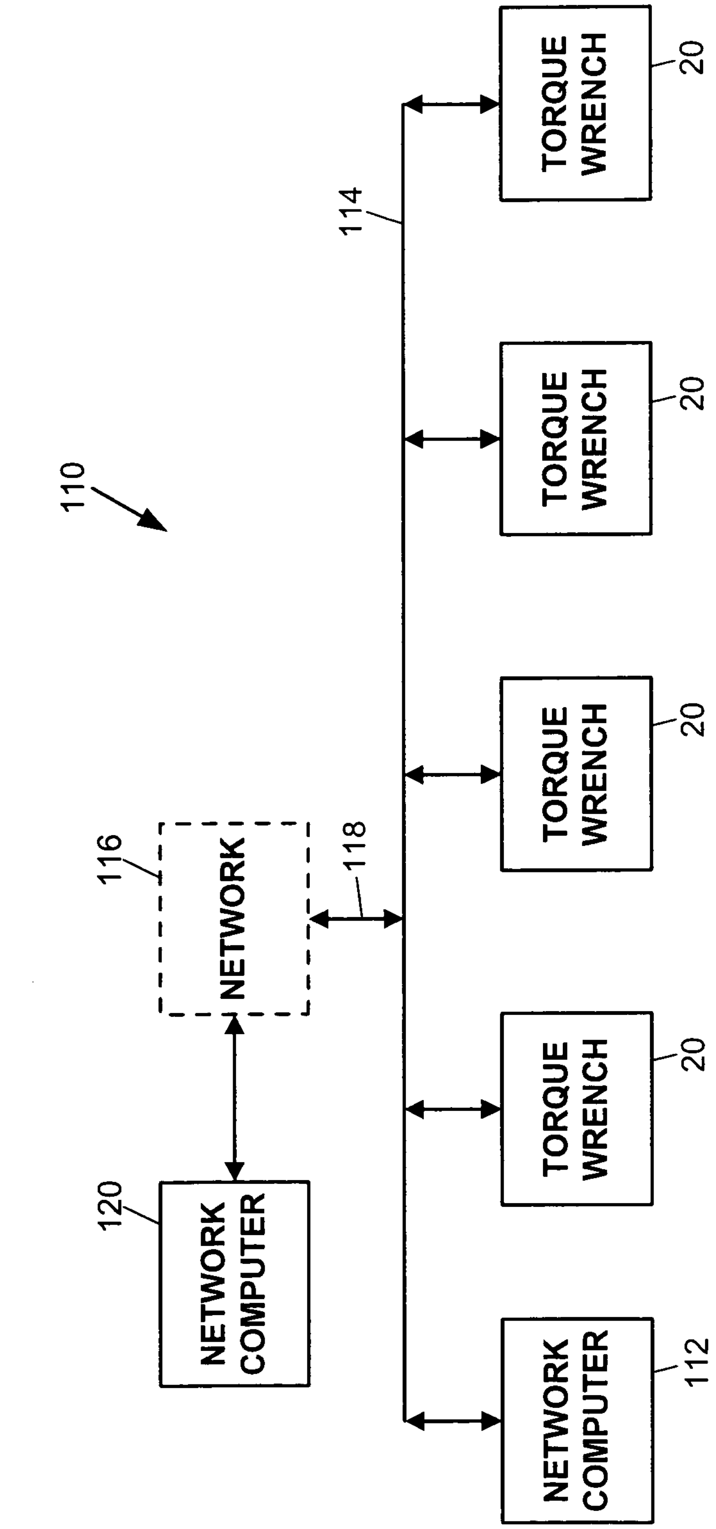
FIG. 7 is an exemplary schematic block diagram of the torque wrench of FIG. 1, communicably coupled to a network and other programmable devices.

As illustrated in the block diagram of FIGS. 6 and 7, the torque wrench 20 may be coupled to a group or network 110 of torque wrenches 20. The network 110 may be operatively coupled to a network computer 112 via a network data link or bus 114. The network 110 may be operatively coupled to other networks 116, which may comprise, for example, the Internet, a wide area network (WAN), or a local area network (LAN), via a network link 118.

The network 116 may include one or more network computers 120 or server computers (not shown), each of which may be operatively interconnected. Where the network 116 comprises the Internet, data communication may take place over the communication link 118 via an Internet communication protocol. In other examples, the network 116 may be, but is not limited to, a private and/or proprietary network, or a traditional network. Similarly, other types of protocols may be used to communicate over the communication link 118, including, but not limited to, proprietary serial based networking protocols.

The network computer 112 may be a server computer and may be used to accumulate and analyze data relating to the operation of the torque wrench 20. For example, the network computer 112 may continuously receive data from each of the torque wrenches 20 indicative of the torque values, torque ranges, etc. The network computer 120 may be a server computer and may be used to perform the same or different functions in relation to the torque wrenches 20 as the network computer 112 described above.

Figure 8:
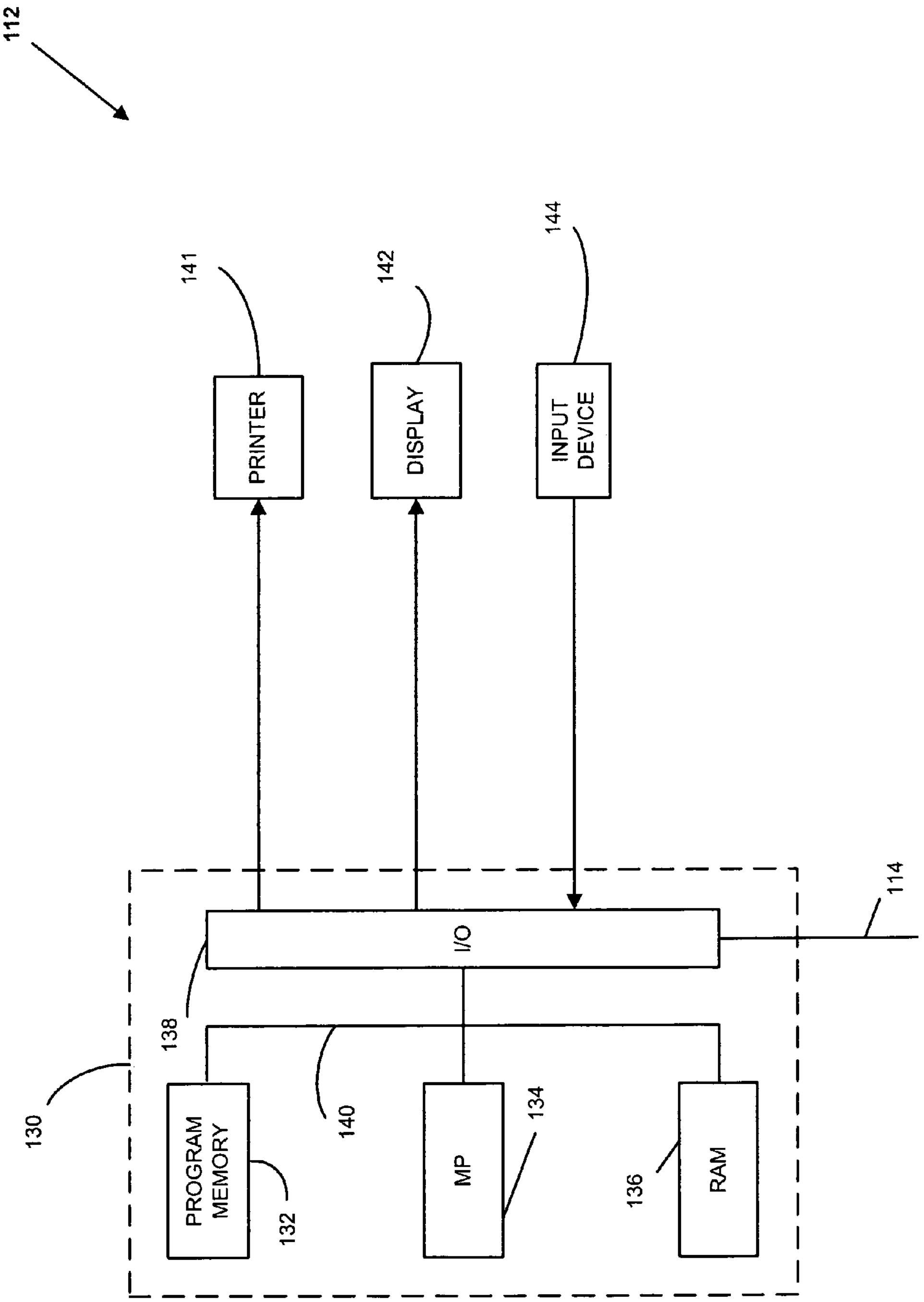
FIG. 8 is an exemplary schematic block diagram of electronic components in a programmable device.

In schematic form, as shown in the block diagram of FIG. 8, a number of components may be incorporated in the electronic devices capable of being communicably coupled to the interface module 28. In this exemplary embodiment, the network computer 112 may include a controller 130 that may comprise a program memory 132, a microcontroller or microprocessor (MP) 134, a random-access memory (RAM) 136, and an input/output (I/O) circuit 138, all of which may be interconnected via an address/data bus 140. It should be appreciated that although only one microprocessor 134 is shown, the controller 130 may include additional microprocessors. Similarly, the memory of the controller 130 may include multiple RAMs 136 and multiple program memories 132. Although the I/O circuit 138 is shown as a single block, it should be appreciated that the I/O circuit 138 may include a number of different types of I/O circuits.

FIG. 8 illustrates that a printer 141, a display 142, and an input device 144 may be operatively coupled to the I/O circuit 138, each of those components being so coupled by either a unidirectional or bidirectional, single-line or multiple-line data link, which may depend on the design of the component that is used.

As shown in FIG. 8, the components 141, 142, and 144 may be connected to the I/O circuit 138 via a respective direct line or conductor. Different connection schemes could be used. For example, one or more of the components shown in FIG. 8 may be connected to the I/O circuit 138 via a common bus or other data link that is shared by a number of components. Furthermore, some of the components may be directly connected to the microprocessor 134 without passing through the I/O circuit 138.

Figure 9:
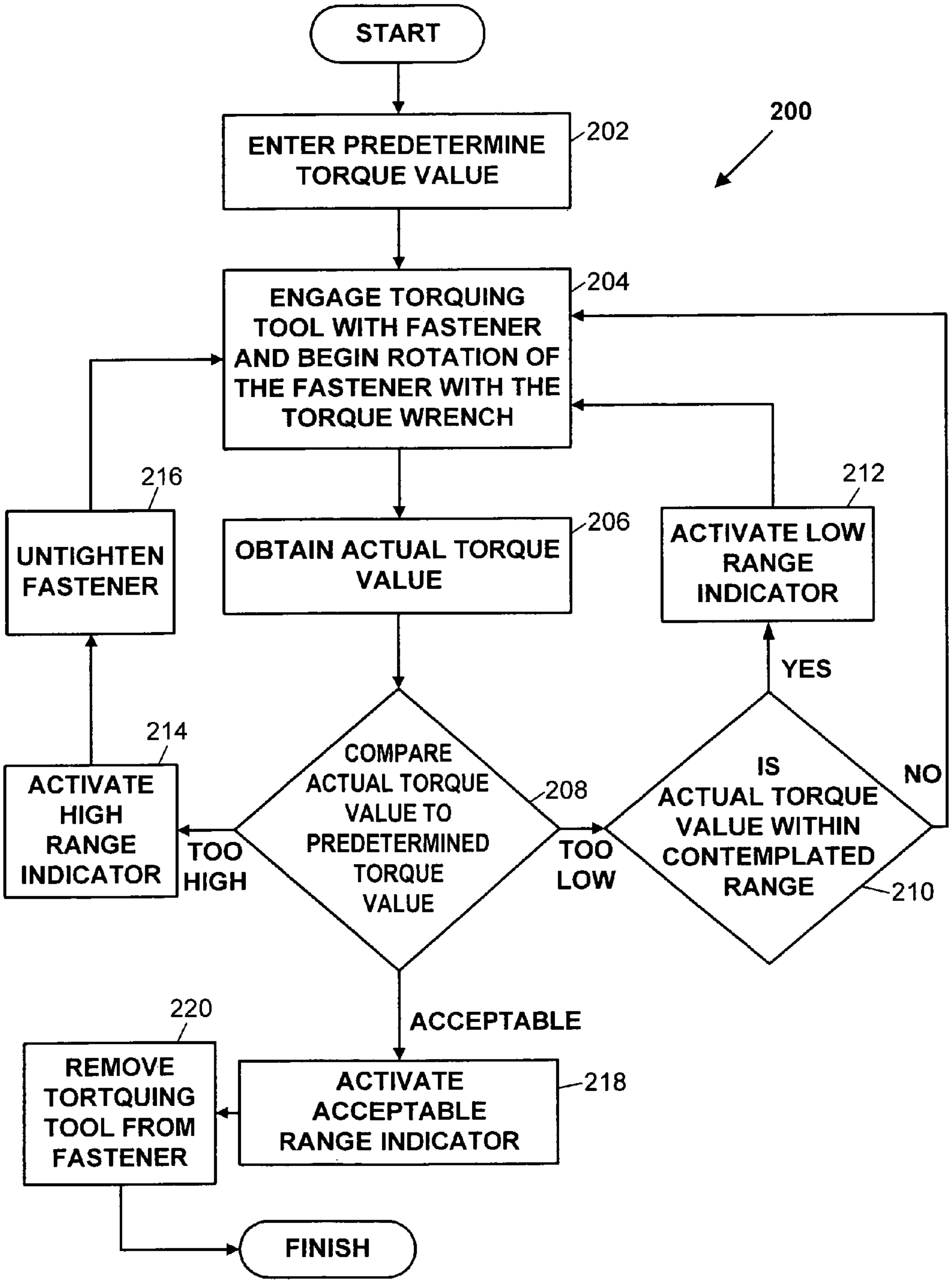
FIG. 9 is a flowchart depicting one manner in which the operation of the torque wrench shown schematically in FIG. 6 may be carried out.

In one exemplary embodiment of an operation (200) as diagrammed in FIG. 9, it can be seen by one of ordinary skill in the art that the torque wrench 20 can be employed for rotating threaded fasteners to a specified torque with a high degree of specificity. For sake of clarity and brevity, the operation 200 of the torque wrench 20 will herein be described in terms of tightening only one fastener, but may be adapted to tighten a plurality of fasteners. More specifically, at a block 202 of the operation 200, the user may enter a predetermined torque value into the interface module 28 and hence the torque wrench 20. The predetermined torque value may be any torque value reasonable or acceptable for the fastener and application, and for this exemplary embodiment is 100 lbs/ft$^2$. The predetermined torque value may be entered into the interface module 28 via any number of ways, including but not limited to, the input device 72, such as the buttons 72 disposed on the interface module 28 and an electronic device that is communicatively coupled to the interface module 28 via the communications port 74 and/or a link or network. At the block 202, the torque value may be zero.

At a block 204, the user may engage the torquing tool with the fastener such that the fastener may be rotated with the torque wrench 20. At the block 202 the torque value may begin increasing from zero.

At a block 206, the torque value may be discernable via the torque value indicator 78 and may correspond to the actual torque value to which the fastener has been tightened. More specifically, the torque sensor 56 may sense a variation in the transducer beam 24 corresponding to the torque value, such as stresses or strains on the mounting bar 26 and/or the transducer beam 24. The torque sensor 56 may translate that variation such that it is perceivable by the interface module 28. Control may then pass to decision diamond 208.

At the decision diamond 208, the actual torque valve is compared to the predetermined value entered at the block 202. The comparison will determine whether the actual torque valve is too low, too high, or acceptable. This determination may be accomplished in several ways, including but not limited to, determining whether the actual value is within a percentage of the predetermined value and/or whether the actual value is within a numerical value of the predetermined value. For example, if the optimum torque value to be achieved is 100+/−5 $lbs/ft^2$, then the various ranges may be calculated by a percentage of the optimum value, such as 75% and 125%. As such, the acceptable torque range may be between 95 and 105 $lbs/ft^2$, the too low torque range may be between 75 and 95 $lbs/ft^2$, and the too high torque range may be between 105 and 125 $lbs/ft^2$. Similarly, the various ranges may be calculated by an arbitrary or calculated numerical value, such as 18 $lbs/ft^2$. As such, the acceptable torque range may be between 95 and 105 $lbs/ft^2$, the too low torque range may be between 82 and 95 $lbs/ft^2$, and the too high torque range may be between 105 and 118 $lbs/ft^2$. The too low and too high ranges, however, need not include minimum and maximum range values, respectively. For example, the too low torque range may be between zero and the lower limit of the acceptable range, and the too high torque range may be from the high limit of the acceptable range to any amount more than that.

If at the decision diamond 208, it is determined that the torque value is too low, control may be passed to decision diamond 210. At the decision diamond 210, it may be determined that the torque value obtained at the block 206 is within the low torque range, or that the torque value has not yet reached the low torque value range. For example, if the low torque value range begins at 75 or 82 $lbs/ft^2$ and the torque value is 70 $lbs/ft^2$, then the torque value is below the contemplated low torque value range and the low range indicator may not be activated. As such, control may pass to a block 204 wherein the operator continues torquing the fastener. If, however, at the decision diamond 210 the torque value is within the low torque range, then the low torque range indicator may be activated at a block 212. For example, if the low torque value range begins at 73 or 85 $lbs/ft^2$ and the torque value is 87 $lbs/ft^2$, then the torque value is in the contemplated low torque value range and the low torque range indicator will be activated. As such, control may pass to the block 204 wherein the operator continues torquing the fastener.

If, however, at the decision diamond 208, it is determined that the torque value obtained at the block 206 is too high, control may pass to block 214. For example, if the high torque value range begins at 105 or 109 $lbs/ft^2$ and the torque value is 111 $lbs/ft^2$, then the torque value is higher than the acceptable torque range and the high range indicator at the block 214 may be activated. As such, control may pass to a block 216 wherein the operator then loosens and possibly removes the fastener to only repeat the process at the block 204.

If at the decision diamond 208, it is determined that the torque value obtained at the block 206 is acceptable, control may pass to a block 218. For example, if the acceptable torque value range is between 95 and 105 $lbs/ft^2$, and the torque value is 100 $lbs/ft^2$, then the torque value is within the acceptable torque range and the acceptable range indicator at the block 218 may be activated. As such control may pass to a block 220 wherein the operator removes the torquing tool from the fastener and has completed the operation.

While the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. A torque wrench, comprising:

a handle;

a torquing tool operatively associated with the handle;

a torque sensor operatively associated with the torquing tool; and a programmable interface module having a torque range indicator, a torque value indicator and a controller, wherein the torque sensor, the torque value indicator and the torque range indicator are communicably coupled to the controller, the controller being programmed to activate the torque range indicator based on a torque value received from the torque sensor and a predetermined torque value, wherein the torque range indicator is a backlight that backlights the torque value indicator on the display screen and changes color dependent on the torque range, such that a user can vary an amount of torque on the wrench according to the torque range.

2. The torque wrench of claim 1, wherein the torque range indicator further includes an audio output.

3. The torque wrench of claim 1, wherein the backlight is at least one of a yellow, green, and red color.

4. The torque wrench of claim 1, wherein the controller is communicably coupled to a second controller.

5. The torque wrench of claim 1, wherein the torque range indicator is activated by a torque value that is too low based on the predetermined torque value.

6. The torque wrench of claim 1, wherein the torque range indicator is activated by a torque value that is acceptable based on the predetermined torque value.

7. The torque wrench of claim 1, wherein the torque range indicator is activated by a torque value that is too high based on the predetermined torque value.

8. The torque wrench of claim 1, wherein the display screen includes a liquid crystal display screen.

9. The torque wrench of claim 1, further including an input device communicably coupled to the controller for entering the predetermined torque value.

10. The torque wrench of claim 1, wherein the torque value indicator is a numerical digital display of the torque value received from the torque sensor.

11. The torque wrench of claim 1, wherein the controller is programmed to activate the torque range indicator if the torque value is within a predetermined percentage of a predetermined torque value.

12. The torque wrench of claim 11, wherein the controller is programmed to activate a low torque range indicator if the torque value is below 95 percent of the predetermined torque value.

13. The torque wrench of claim 11, wherein the controller is programmed to activate a high torque range indicator if the torque value is above 105 percent of the predetermined torque value.

14. The torque wrench of claim 1, wherein the controller is programmed to activate the torque range indicator if the torque value is within a predetermined numerical range of a predetermined torque value.

* * * * *